United States Patent [19]
La Fiandra et al.

[11] 4,378,989
[45] Apr. 5, 1983

[54] APPARATUS FOR LASER ASSISTED MACHINING OF GLASS MATERIALS

[75] Inventors: Carlo F. La Fiandra, New Canaan; Burke E. Nelson, Ridgefield; Douglas F. Baker, West Reading, all of Conn.

[73] Assignee: The Perkin-Elmer Corporation, Norwalk, Conn.

[21] Appl. No.: 310,176

[22] Filed: Oct. 9, 1981

[51] Int. Cl.³ .................... C03B 29/00; C03B 33/10
[52] U.S. Cl. ...................................... 65/271; 65/272; 65/275; 65/286
[58] Field of Search ................ 65/271, 272, 269, 286, 65/275

[56] References Cited

U.S. PATENT DOCUMENTS

| | | | |
|---|---|---|---|
| 2,422,482 | 6/1947 | Guyer | 65/271 |
| 2,818,683 | 1/1958 | Nieman et al. | 64/269 X |
| 3,498,777 | 3/1970 | Kaucher et al. | 65/272 X |
| 4,146,380 | 3/1979 | Caffarella et al. | 65/271 X |

*Primary Examiner*—Arthur D. Kellogg
*Attorney, Agent, or Firm*—S. A. Giarratana; E. T. Grimes; T. P. Murphy

[57] ABSTRACT

A system for machining a glass workpiece comprises means for rotating the workpiece. A concentrated beam of energy is axially directed to the surface of the workpiece to soften the glass material. The softened glass material is then removed by a pointed or relatively narrow tool which is precisely located with respect to the area treated by the energy beam.

8 Claims, 2 Drawing Figures

APPARATUS FOR LASER ASSISTED MACHINING OF GLASS MATERIALS

BACKGROUND OF THE INVENTION

Techniques for welding, cutting or drilling workpieces with laser beams are well known. A patent to Okuda U.S Pat. No. 4,177,026 discloses the use of a laser beam in a machining operation. It is also known in the prior art that material may be heated to permit easier removal of machined parts during a machining operation. Such a method and apparatus relating to hot machining is disclosed in a patent to W. W. Caigill, Jr. U.S. Pat. No. 2,861,166 (U.S. Pat. No. Re. 25,105). The cutting and removal of material from a rotating workpiece and moving the various cutting and removing elements as the machining process takes place is also known. Such a method and apparatus is disclosed in a patent to Blomgren et al U.S. Pat. No. 3,862,391.

Most of the techniques involving machining, such as the above-mentioned patents, have been directed to machining and removing of material from metal parts where the use of high forces and high speeds do not tend to damage the relatively solid metal workpiece being processed. Such techniques, however, cannot be directly applied to the machining of glass workpieces. The reason for this is the relatively brittle nature of glass and the tendency to crack if subjected to even relatively small amounts of forces.

At the same time it is highly desirable to produce systems and methods for removing material from the surface of glass under repeatably controlled conditions at relatively fast rates. For example, in the field of optics, the fast removal of glass material under controlled conditions could lead to high cost reduction for the elements used in optical systems.

OBJECTS OF THE INVENTION

It is an object of this invention to provide an improved method for removing material from the surface of glass.

It is a further object of this invention to provide an improved process to remove material from the surface of glass under repeatable control conditions at high mass rates.

It is a further object of this invention to provide an improved process for removing material from a surface of glass in less time than conventional techniques used heretofore.

SUMMARY OF THE INVENTION

In accordance with the present invention means are provided for holding and rotating a glass workpiece. An applicator directs an energy beam such as a laser beam towards the workpiece as the workpiece is rotated to soften or melt into a pliable plastic like state the glass in the area of impingement of the beam. A material removal device, such as a pointed or sharp tool bit, is disposed in close fixed proximity to the beam applicator in physical contact with the workpiece to remove the glass material softened or melted by the beam. Means are provided to change the relative positions of the beam application and material removal device with respect to the glass workpiece as the machining operation takes place.

Other objects and advantages of the present invention will be apparent and suggest themselves to those skilled in the art, from a reading of the following specification and claims, taken in conjunction with the accompanying drawings.

DETAILED DESCRIPTION OF THE PREFERRED EMBODIMENTS

Figure 1:
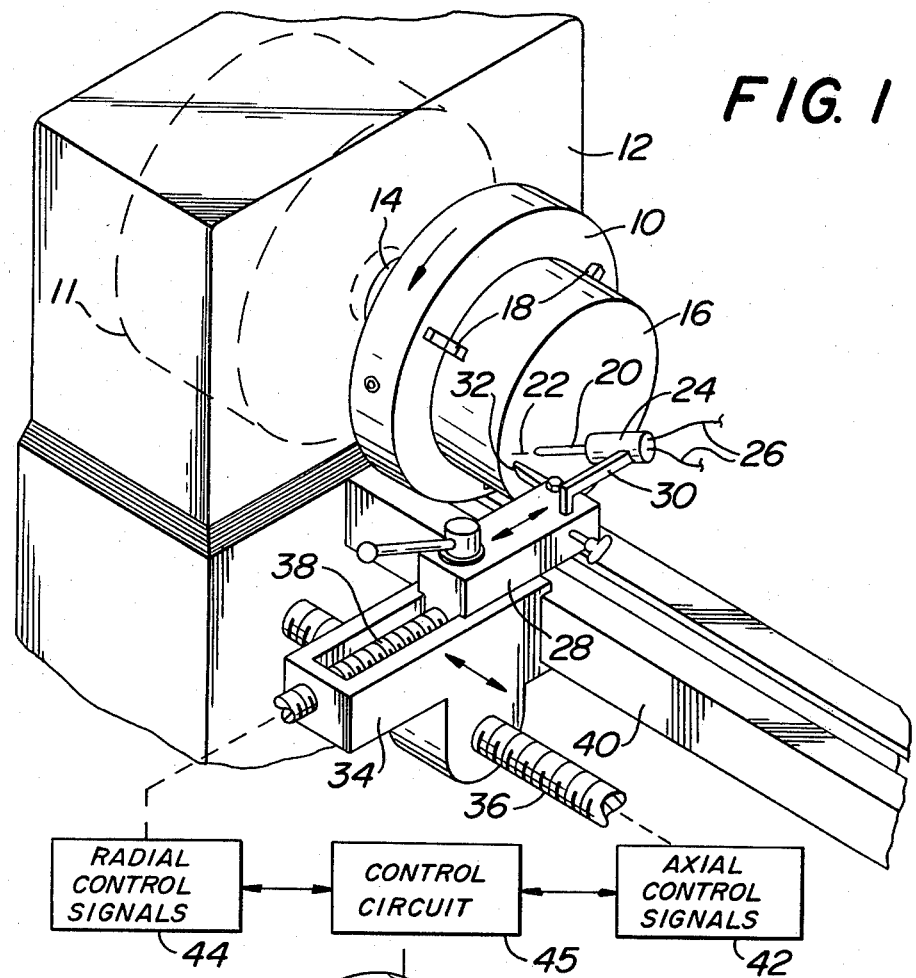
FIG. 1 is an isometric view illustrating a rotatable glass workpiece being machined by energy beam means and material removal means in accordance with the present invention.

Referring to FIG. 1, a spindle 10 is adapted to be rotated by a motor 11 disposed within a housing 12. A shaft 14 of the motor extends through the housing and is connected to the spindle 10.

A glass workpiece 16 is secured and held in place on the spindle 10 by suitable means such as attachment bars 18. The spindle 10 is rotated to rotate the workpiece 16. As the glass workpiece 16 is rotated, a machining operation takes place on the surface of the glass.

A laser applicator or gun 20 directs a beam 22 in an axial direction toward the surface of the glass workpiece 16. During irradiation the laser beam applicator is maintained a constant distance from the glass workpiece 16 and is moved in the radial direction. The laser applicator 20 is connected to a mount 24 which in turn is connected to electrical leads 26 which lead to the basic power units and laser beam generator for creating the laser beam. The basic electronic and electrical power units for generating the laser beam are not directed to the present invention and therefore not shown or illustrated in detain. It should be noted that while a laser beam is herein disclosed, the softening energy beam may be an electron beam, or a similar concentrated beam of energy such as a flame.

The laser mount 24 is connected to a tool holder support 28 through an arm 30. A material removal tool 32 is also secured to the tool holder support 28. The tool 32 includes a relatively sharp point in direct physical contact with the glass workpiece 16 to perform a cutting or material removal operation.

The laser beam 22 is directed against the surface of the glass workpiece 16 so as to soften or melt the area of glass impinged by receiving the laser beam 22. The exact power requirements for the laser beam 22 is dependent upon the nature of the glass in the workpiece 16, the speed of rotation of the spindle 10 and various other factors determined by the particular design requirements of the workpiece 16.

The material removal tool 32 is located in fixed close proximity directly below the laser beam 22 so that the material softened or melted by the beam 22 is removed before it has time to cool or harden. Preferably, the tool bit 32 is relatively close to the beam 22 so that the melted glass is still in a molten, i.e., pliable plastic state condition to permit removal by the tool bit 32. If the distance between the beam 22 and the tool bit 32 is too great, it is possible that the molten glass produced by the beam 22 will resume a hardened condition to prevent removal thereof. If the glass is not sufficiently soft, it is possible that the tool bit 32 will cause the glass workpiece 16 to crack.

As the machining operation progresses, the laser beam applicator 20 and the tool 32 are moved radially across the glass workpiece 16 as it is rotated. The tool 32 is maintained at the same radial position as the laser applicator 20 during the removal of material. The tool 32 is in the same path as the laser beam 22 and the material removal takes place as soon as the glass is softened or in molten form.

It is important that the tool bit 32 be relatively sharp or narrow and conform as much as possible to the relatively narrow laser beam 22 which softens or melts the glass in a relatively small area. The reason for this is that if the tool bit 32 is too wide, part of the surface of the tool bit may be in contact with the adjacent hard surface of the glass which is not effected by the laser beam. This would cause irregular or no removal of the softened glass as well as accelerate wear of the tool bit 32. Also, if a wide tool bit contacts the hardened surface of the glass workpiece 16 with too great a force, the glass workpiece 16 would tend to crack.

As the spindle 10 is rotated and glass is removed from the surface of the glass workpiece 16, the laser applicator 20 and the tool bit 32 are moved radially to permit the entire surface of the workpiece 16 to be machined. This is accomplished by movement of the tool holder support 28. It is apparent, however, that the laser gun 20 and the cutting tool 32 may be held stationary with the workpiece 16 moved radially as it is also rotated, if desired.

The tool holder 28 is mounted on a cross slide member 34 which is adapted to receive a pair screw elements 36 and 38. The cross slide member 34 is in turn mounted onto a support member 40. Rotation of the screw 38 causes the tool holder 28 to be moved axially with respect to the rotation of the glass workpiece 16. Rotation of the screw 38 causes the tool holder 28 to be moved radially with respect to the rotation of the workpiece 16. Other means for moving the laser beam applicator 20 and tool 32 during the machining operation may be employed.

In order to achieve uniformity of removal of material from workpieces 16 under repeatable controlled conditions, these various rotations or movements of the screws 36 and 38, or other actuating means if employed, are controlled by numerical control signals from circuits 42 and 44 respectively. A control means circuit 45 includes means for producing the appropriate signals for sources 42 and 44 for producing the appropriate Z or axial signals and X or radial signals.

The control circuit 45 may include means for sensing the actual positions on the laser applicator 20 and tool 32 and control the speed of movements thereof as the machining progresses. The speeds at which the various illustrated elements are operated are dependent upon many variables including the power of the laser beam, the depths to be cut in the workpiece, the distance of the applicator from the workpiece, etc.

In general, various means are associated with the equipment to determine the precise positions of the cutting tool and the laser gun as the cutting process proceeds. Upon receiving signals of certain condition, the numeral control signals from the control circuit 45 to the circuits 42 and 44 will cause movement or rotation of the threaded members 36 and 38.

As the cutting operation proceeds, the glass workpiece 28 including the cutting tool 32 and the laser applicator 20 is moved axially and radially with respect to the rotation of the glass workpiece 16. The surface of the workpiece 16 may be cut to different relative depths as the machining operation develops, if desired. Thus the workpiece 16 may be shaped for a particular optical use.

Because the circumference of the workpiece 16 gradually decreases as the tool bit 32 and laser applicator 20 moves from the outer circumference of the workpiece to the center changes, it may be desirable to slow down or speed up the radial and axial movements. In some cases, the speed which the workpiece 16 is rotated may also be varied. Various sensors relating to the heating and the condition of the molten glass may be used to control the various operations relating to rotation of the workpiece as well as the axial and radial movements of the tool bit and laser gun.

Figure 2:
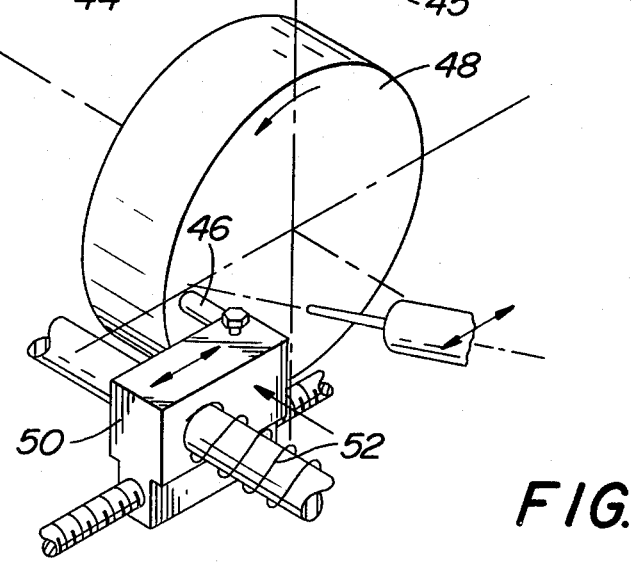
FIG. 2 is an enlarged view illustrating some of the parts of FIG. 1 in a slightly different embodiment.

Referring to FIG. 2, another embodiment of the present invention is illustrated. The basic operation is substantially the same as that illustrated in FIG. 1. Instead of a pointed cutting tool 2 being used, a burnishing tool 46 is employed. The burnishing tool may be rounded at its end so that only a small pointed area contacts a glass workpiece 48.

The burnishing tool 46 is secured to a mounting member 50. The member 50 and burnishing tool 46 is spring loaded by a spring 52 which exerts an axial force and urges the tool 46 against the glass workpiece 48. The spring 52 has a relatively low spring rate to load the burnishing tool 46 against the workpiece 48 with a low controlled force. The means for moving the mount 50 axially and radially may be similar to that of FIG. 1 and therefore they will not be redescribed. The various arrows illustrate the various directions of movements of the elements involved.

What is claimed is:

1. A system for removing material from the surface of a glass workpiece comprising:
    (a) means for holding and rotating said glass workpiece;
    (b) a beam applicator for directing concentrated energy beam towards the surface of said glass workpiece to soften the glass material in the area of impingement of said beam;
    (c) a material removal device disposed in close fixed proximity to said beam applicator in physical contact with said glass workpiece and in the path of rotation of said glass workpiece following the softening of said glass material by said beam to remove the material softened by said beam, said material removal device being maintained at substantially the same radial distance as said beam applicator during removal of material; and
    (d) means for changing the relative positions of said beam applicator and said material removal device by relatively moving said beam applicator and said material removal device radially with respect to the direction of rotation of said glass workpiece whereby different areas of said glass workpiece are exposed to said beam to permit removal of material therefrom.

2. A system as set forth in claim 1 wherein said material removal device comprises a tool having a relatively pointed end surface for contacting said glass workpiece at the area of impingement of said beam.

3. A system as set forth in claim 2 wherein the relative movements of said beam applicator and said tool relative to said rotatable glass workpiece are controlled by a numeral control electrical system.

4. A system as set forth in claim 3 wherein said tool comprises a sharp pointed tool bit.

5. A system as set forth in claim 3 wherein said tool comprises a burnishing tool and a spring having a relatively low spring rate to load said burnishing tool against said glass workpiece with a low spring rate controlled force.

6. A system according to claim 1, 2, 3, 4 or 5 wherein said concentrated energy beam is a laser.

7. A system according to claim 1, 2, 3, 4 or 5 wherein said concentrated energy beam is an electron beam.

8. A system according to claim 1, 2, 3, 4 or 5 wherein said concentrated energy beam is a flame.

* * * * *